(12) United States Patent
Rebut et al.

(10) Patent No.: US 8,180,108 B2
(45) Date of Patent: May 15, 2012

(54) METHOD FOR DETERMINING THE DISTANCE OF VISIBILITY FOR A DRIVER OF A VEHICLE

(75) Inventors: Julien Rebut, Paris (FR); Joël Leleve, Epinay sur Seine (FR)

(73) Assignee: Valeo Vision, Bobigny (FR)

( * ) Notice: Subject to any disclaimer, the term of this patent is extended or adjusted under 35 U.S.C. 154(b) by 1005 days.

(21) Appl. No.: 11/762,880

(22) Filed: Jun. 14, 2007

(65) Prior Publication Data

US 2007/0291990 A1 Dec. 20, 2007

(30) Foreign Application Priority Data

Jun. 15, 2006 (FR) ...................................... 06 05362

(51) Int. Cl.
*G06K 9/00* (2006.01)
(52) U.S. Cl. ................. 382/104; 356/3; 340/901
(58) Field of Classification Search .................. 382/104; 356/3; 340/901
See application file for complete search history.

(56) References Cited

U.S. PATENT DOCUMENTS

| | | | |
|---|---|---|---|
| 5,987,152 A | 11/1999 | Weisser | |
| 6,362,773 B1 | 3/2002 | Pochmuller | |
| 6,765,353 B2 * | 7/2004 | Leleve | 315/77 |
| 7,423,752 B2 * | 9/2008 | Leleve et al. | 356/338 |
| 7,602,937 B2 * | 10/2009 | Mian et al. | 382/100 |
| 2003/0197867 A1 * | 10/2003 | Kwon | 356/437 |
| 2004/0046866 A1 | 3/2004 | Pochmuller et al. | |
| 2005/0231725 A1 | 10/2005 | Franz | |
| 2008/0169912 A1 * | 7/2008 | Kawasaki | 340/425.5 |

FOREIGN PATENT DOCUMENTS

| | | |
|---|---|---|
| DE | 10034461 A1 | 1/2002 |
| EP | 1067399 A2 | 1/2001 |
| EP | 1422663 A1 | 5/2004 |
| FR | 2876826 A1 | 4/2006 |
| WO | 03069275 A1 | 8/2003 |
| WO | WO 03/069275 A1 * | 8/2003 |
| WO | 03093864 A1 | 11/2003 |

OTHER PUBLICATIONS

Barun, V.V. et al.: "Nontraditional Features in Active Vision Through a Turbid Medium: Evaluation and Optimization on the Base of Modern Radiative Transfer Approaches," Proceedings of the SPIE, SPIE, Bellingham, VA, US, vol. 3837, Sep. 20, 1999, pp. 414-425, XP008019411; ISSN: 0277-786X.

Busch, C. et al.: "Wavelet Transform for Analyzing Fog Visibility," IEEE Intelligent Systems, IEEE Service Center, New York, NY, US, vol. 13, No. 6, Nov. 1998, pp. 66-71, XP002247567; ISSN: 1094-7167.

* cited by examiner

*Primary Examiner* — Jason M Repko
*Assistant Examiner* — Katrina Fujita
(74) *Attorney, Agent, or Firm* — Jacox, Meckstroth & Jenkins

(57) ABSTRACT

A method for determining the distance of visibility for a driver of a vehicle in the presence of an element disrupting the visibility of the driver, the method comprising the following steps: determining the luminosity of the pixels of a region of an image taken in the field of vision of the driver, resulting in a luminosity curve, determining a first tangent to the curve of luminosity, determining a second tangent to the curve of luminosity, determining a sweep-line according to the first tangent and second tangent, the sweep-line being representative of the distance of visibility.

15 Claims, 8 Drawing Sheets

METHOD FOR DETERMINING THE DISTANCE OF VISIBILITY FOR A DRIVER OF A VEHICLE

BACKGROUND OF THE INVENTION

1. Field of the Invention

The present invention relates to a method for determining a distance of visibility for a driver of a vehicle in the presence of an element disrupting the visibility of the driver. The disruptive element is for example fog and the vehicle, a motor vehicle for example.

2. Description of the Related Art

According to a known prior art EP 1 422 663 A1, such a method of determination comprises the following steps:
  videoing at least one image of a field of space located in front of the vehicle, the image being defined by an array of pixels,
  separating the image in two parts by a line passing through a pre-set point,
  determining the luminosity of the pixels of the line, resulting in a curve of luminosity,
  determining an inflection point of the luminosity curve by calculating the derivative of the curve,
  determining the distance of visibility of the driver of the vehicle according to the position of the inflection point on the image.

Such a solution presents the following disadvantages.

Firstly calculation of the derivative leads to problems in interpretation, significant inaccuracies and errors, particularly if there is an obstacle on the road over which a vehicle is travelling, for example another vehicle, a bridge and the like. Indeed such an obstacle will generate a plurality of points of inflection when calculating the derivative, hence the difficulty in distinguishing the various points of inflection if they are close to one another and in choosing the good inflection point corresponding to the distance of visibility searched.

Secondly the calculation of the derivative amplifies the noise generated on the luminosity curve causing uncertainties on the curve itself.

Lastly calculation of the derivative represents a heavy computational load.

What is needed, therefore, is an improved system and method that provides improvements over prior art systems and methods.

SUMMARY OF THE INVENTION

The present invention provides a remedy for these disadvantages of the prior art.

Indeed according to a first object, it concerns a method for determining a distance of visibility for a driver of a vehicle in the presence of an element disrupting the visibility of the driver, comprising the following steps:
  videoing at least one image of a field of space located in front of the vehicle, the image being defined by an array of pixels and sweep-lines,
  separating the image in two parts by a first line passing through a pre-set point,
  determining the luminosity of the pixels of the first vertical, resulting in a luminosity curve,
wherein the method also comprises the following steps:
  determining a first tangent to the curve of luminosity tangential at a place of the curve representative of a region of luminosity substantially independent of the disruptive element,
  determining a second tangent to the curve of luminosity tangential at a place of the curve representative of stabilization of the luminosity,
  determining a sweep-line according to the first tangent and second tangent, the sweep-line being representative of the distance of visibility.

As will be seen below in detail, determination of the distance of visibility only utilizes simple linear combinations, this determination thus being faster than that of the prior art. Moreover, it removes uncertainties, related to the noise generated by calculation of the derivatives, from the prior art, since there is no longer any derivative calculation. Lastly this method can be used in the presence of obstacles on the road, without determination of the distance of visibility being disrupted According to non-restrictive embodiments, the method for determining the distance of visibility comprises the following additional features:
  The first line is a vertical straight line. Thus determining such a vertical straight line is fast.
  the disruptive element is fog. Thus the method is useful in time of fog.
  the method comprises moreover:
    a step of searching the zones of the image, each responding to a predicate of homogeneity,
    determining the center of gravity for each of the zones,
    determining the global centre of gravity of each of the centers of gravity for the zones, the global center of gravity being the pre-set point.
  Thus the global center of gravity G is the resultant of centers of gravity for two homogeneous zones on the road and in the sky. By searching these zones, the risk of measurements being disrupted by obstacles (road edges, central reservation, trees, etc.) is limited. This is useful in bends.
  the second tangent is parallel to the first tangent. This renders the possibility of having simple and fast calculation.
  the sweep-line is calculated according to an intersection point between the luminosity curve and a line parallel to the first tangential at a given distance from the first tangent and second tangent.
  the given distance is the distance between the first tangent and second tangent divided by two.
  the distance of visibility is determined on the basis of the sweep-line found and by means of a correspondence table or a trigonometric calculation. Determining the distance of visibility by reading a correspondence table is very fast.
  trigonometric calculation is as follows: the distance of visibility is equal to a height relative to the ground of an element, videoing the image, divided by the tangent of: the value of a sight angle of the highest sweep-line, plus a total angular field divided by the number of the highest sweep-lines, the lot multiplied by:
    this number of the highest line minus the sweep-line corresponding to the intersection point calculated.

The invention, according to a second object, concerns a distance-determining device for a driver of a vehicle in the presence of an element disrupting the visibility of the driver, comprising:
  means to receive at least one image videoed on the basis of a field of space located in front of the vehicle, the image being defined by an array of pixels and sweep-lines,
  means to separate the image in two parts by a first line passing through a pre-set point,
  means to determine the luminosity of the pixels of the first line, resulting in a luminosity curve, wherein the device comprises moreover:
 means to determine a first tangent to the curve of luminosity tangential at a place of the curve representative of a region of luminosity substantially independent of the disruptive element,
 means to determine a second tangent to the curve of luminosity tangential at a place of the curve representative of stabilization of the luminosity, and
 means to determine a sweep-line depending on the first tangent and second tangent, the sweep-line being representative of the distance of visibility.

According to non-restrictive embodiments, the device comprises the following additional features:
 the device is integrated in a camera on board the vehicle.
 the sweep-line is calculated according to an intersection point between the luminosity curve and a line parallel with the first tangent and second tangential at a given distance from the first tangent and second tangent.
 the given distance is the distance between the first tangent and second tangent divided by two.
 the distance of visibility is determined on the basis of the sweep-line found and by means of a correspondence table or a trigonometric calculation.

The invention, according to a third object, concerns a computer program product including one or more sequences of instructions to implement, when the program is executed by a processor, the method according to any one of the preceding features.

BRIEF DESCRIPTION OF THE ACCOMPANYING DRAWINGS

Other features and advantages of this invention will be better understood by way of the description and drawings, wherein.

DETAILED DESCRIPTION OF NON-RESTRICTIVE EMBODIMENTS OF THE INVENTION

Figure 1:
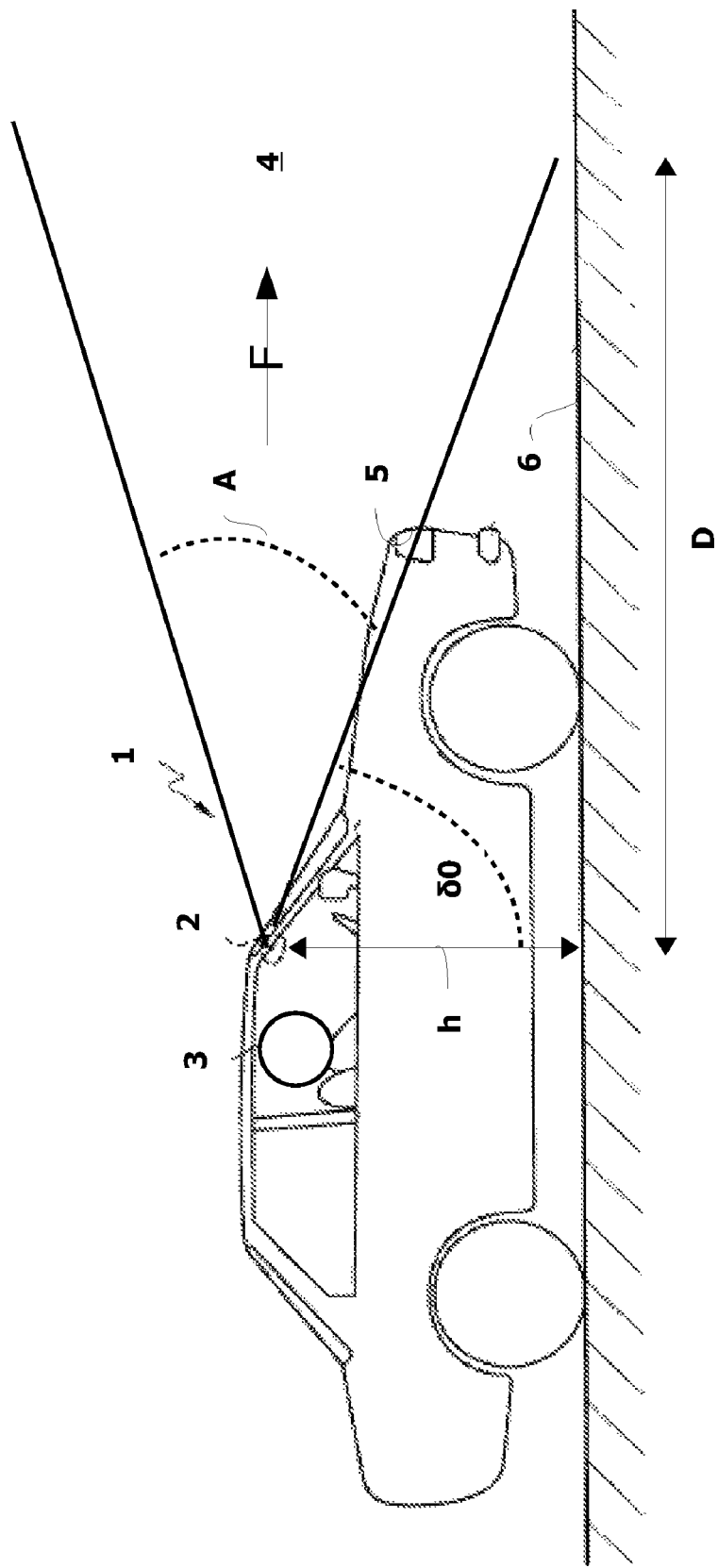
FIG. 1 is a diagrammatic illustration of a vehicle provided with a camera comprising a device for implementing the method according to the invention.

On FIG. 1 a vehicle 1 equipped with a camera 2 and driven by a driver 3, who can observe a scene in a field of space 4 located in front of the vehicle when his vehicle 1 is stationary or moving, is shown in a diagrammatic way.

Camera 2 is situated at a height h from the surface of road 6 and is located for example in the front of the vehicle or on the side. It is fitted for example behind the windscreen and points to the front of the scene in the traveling direction F of the vehicle. Thus camera 2 comprises a total angular field A which can be compared to the field of space located in front of vehicle 1, this total angular field A being defined by a minimum sight angle $\alpha 0$ illustrated on FIG. 1. A distance of visibility D for a driver will be linked to the position of camera 2 on vehicle 1.

Figure 2:
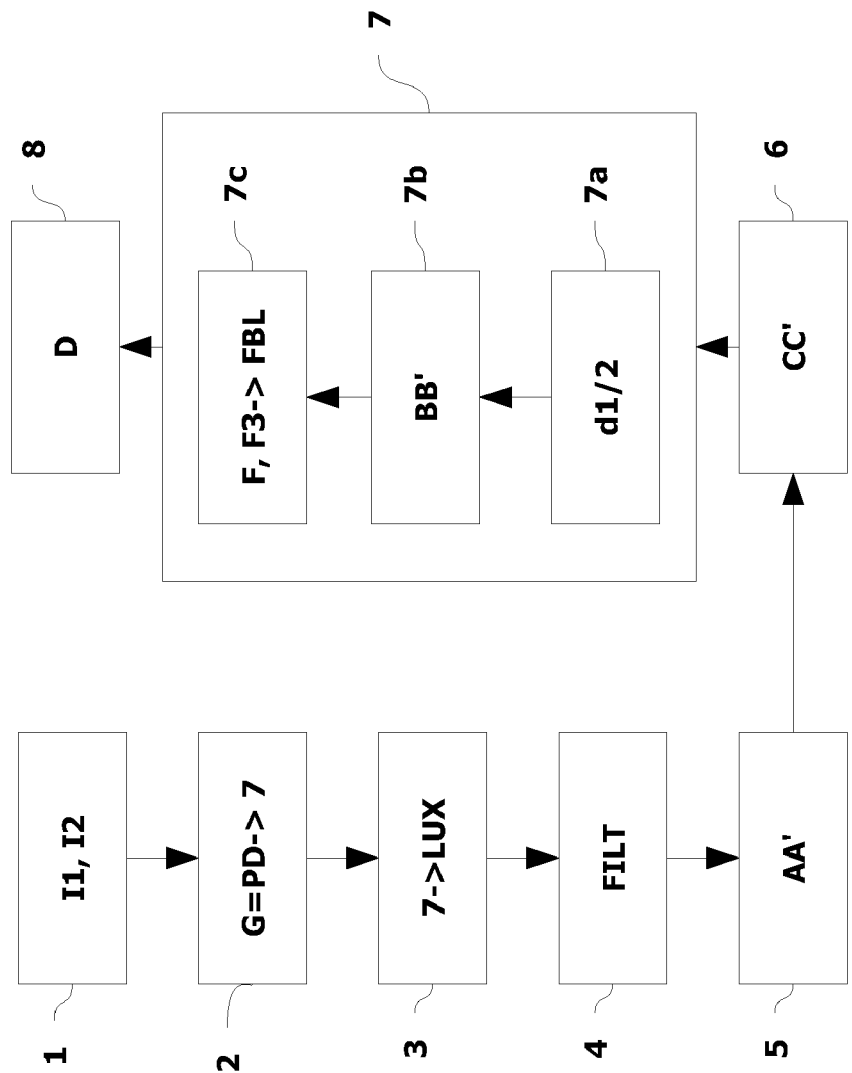
FIG. 2 is a diagram showing the various steps of the method according to the invention.

In order to determine the distance of visibility D for driver 3 when there is an element BR disrupting or modifying the visibility, particularly if this disruptive element is fog, for anticipating switching on the fog lamps 5 of vehicle 1, the following steps are carried out as illustrated on FIG. 2.

In a first step (block 10), camera 2 takes an image I1 in the field of space 4 located in front of vehicle 1. The field of space 4, in the non-restrictive example given, does not comprise any obstacle on road 6.

Figure 3:
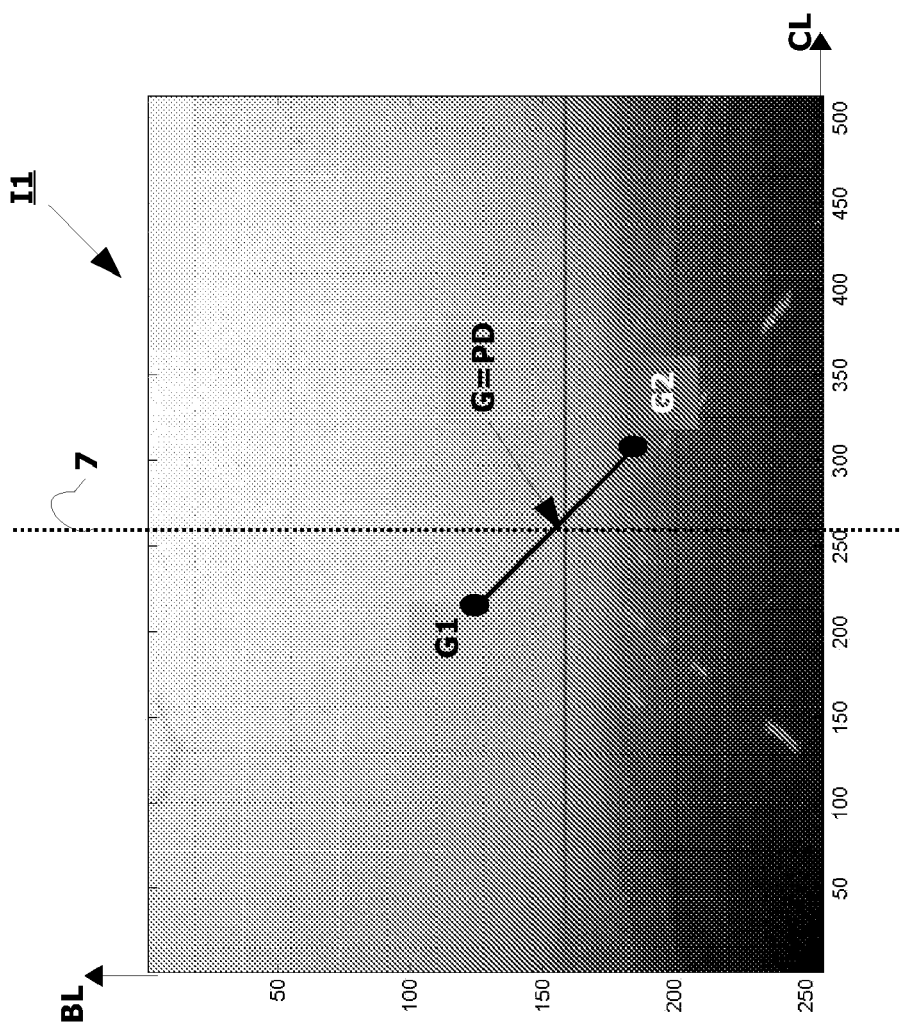
FIG. 3 illustrates a first image as videoed in the method according to the invention.

FIG. 3 illustrates an image I1 in black and white taken by camera 2. This image I1 illustrates a road in the presence of fog BR. The image I1 is characterized by an array of sweep-lines BL and by an array of pixels PIX representing each point of the image whose luminosity changes from black to white, the luminosity being a quantity of light received for each pixel. Each pixel in a non-restrictive example is coded on a byte with 256 possible grey levels. The image I1 is characterized in x-axis by a column number CL varying from 0 to 500 and in y-axis by sweep-lines BL of the image varying from 0 to 250.

In a second step (block 12), a search for zones of the image I1 is carried out, each responding to a predicate of homogeneity. This search can be implemented for example, in a non-restrictive embodiment, using a method of segmentation by division-fusion such as the "quadtree" method known by those skilled in the art. The quadtree has a plurality of nodes, each node having exactly four node children, except the terminal nodes. Each node corresponds to a block, that is to say a zone of the image square in shape. Each block associated with a node is analyzed recursively in order to decide if it must be divided into four sub-blocks. The recursive analysis stops when each sub-block conforms to a photometric homogeneity predicate of the co-occurrence matrices.

Other methods such as k-means algorithms can also be used.

The application of the search for zones of homogeneity renders the possibility of defining two areas on the image I1 having for centers of gravity G1 and G2 respectively, as illustrated on FIG. 3.

The global center of gravity G is then calculated for the two centers of gravity G1 and G2 through which a first line 7 is made to pass. This first line 7 is representative of the transparency of the atmosphere. The global center of gravity G represents a pre-set point PD through which first line 7 passes. This pre-set point PD, in another non-restrictive example, can be the center of the image I1.

Thus the global center of gravity G is the resultant of centers of gravity for two homogeneous zones on the road and in the sky. By searching these two homogeneous zones, the risk of measurements being disrupted by obstacles (road edges, central reservation, trees, etc.) is limited. This is useful in bends where the first line 7, centered in the middle of the image, would only see one of the two road edges for example.

Each of the points of first line 7 can be characterized by a sweep-line BL and by luminosity corresponding to a certain grey level GL.

In a non-restrictive embodiment, this first line 7 is a vertical straight line. The fact of using a vertical straight line 7 rather than another line (curve and diagonal for example) renders the possibility of avoiding tedious computation times. This vertical straight line 7 is indicator of the transparency of the atmosphere; therefore the luminosity of each point of the environment located on the vertical line 7 will be recorded.

Figures 4, 5:
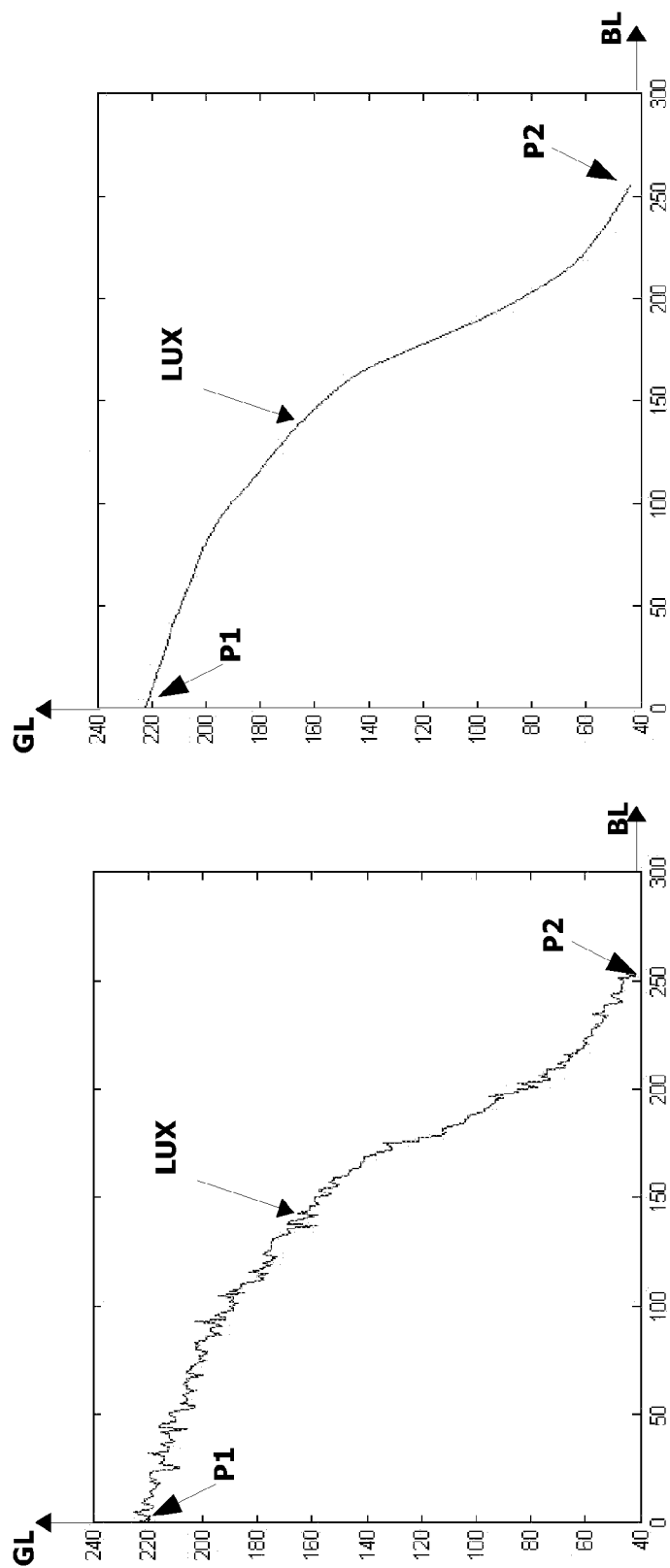
FIG. 4 illustrates a luminosity curve obtained on the basis of the image on FIG. 3.
FIG. 5 illustrates the luminosity curve of FIG. 4 after filtering.

Thus, in a third step (block 14), a luminosity curve LUX (also called densitometric curve of the fog) is determined on the basis of the vertical line 7 obtained. The luminosity of the pixels PIX of the vertical line 7 is determined according to the position in height of the pixel on the vertical line 7. Such a luminosity curve LUX is illustrated on FIG. 4. It presents an inverted S-shape in this non-restrictive example. It is thus comparable to an S-curve.

The curve LUX in y-axis represents the value of the grey level GL of points PIX of the vertical line 7 and in x-axis, the number of the sweep-line BL of these same points. Thus point P1 corresponds to sweep-line 0 and has a grey level GL equal to approximately 220. In the same way the point P2 corresponds to the sweep-line 250 and has a grey level GL equal to approximately 40.

It will be noted that the slope of this curve LUX varies according to the characteristic (for example concrete, tar, dirt, etc.) of road 6. The lighter the road (for example concrete), the steeper the slope. On the contrary, if it is dark (for example tar), the slope will be less steep. It will be noted that this luminosity curve LUX comprises noise whose amplitude, is commensurate in particular with the heterogeneities of the road (fine gravel, paving blocks, tar, marking on the surface, skid marks, etc.), variations in sensitivity (differences of grey level) between the successive pixels, spurious electromagnetic signals (electric noise) and thermal problems. These noises are high frequency noises.

Thus, in a fourth step (block 16), the noise on the luminosity curve LUX is filtered by means of filtering FILT, in a non-restrictive example, these means of filtering FILT completing a sliding average on an optical window of a few pixels. The luminosity curve, filtered in this way, is illustrated on FIG. 5.

In the following steps, a method of tangents applied to the S-shaped curve of luminosity is used to search a sweep-line FBL representative of the distance of visibility D.

Figure 6:
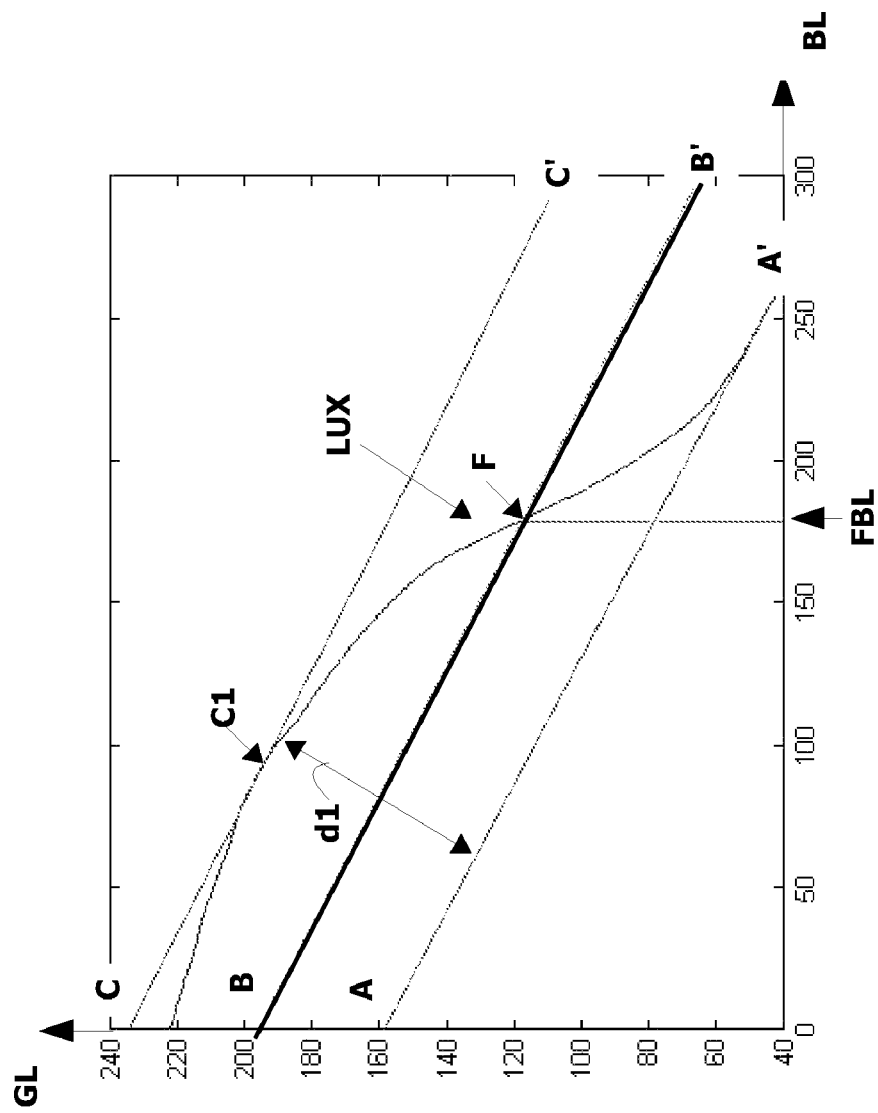
FIG. 6 illustrates the luminosity curve of FIG. 5 on which tangents are plotted.

Thus, in a fifth step (block 18), a first tangent AA' to the luminosity curve LUX is determined. This tangent AA' is tangential at a place of the curve representative of a region of luminosity substantially independent of fog BR. Such a tangent is illustrated on FIG. 6.

As can be seen, tangent AA' is tangential at the lower part of the curve. This part of the curve is representative of the evolution of luminosity of the ground in a region close to the vehicle and thus substantially independent of the density of the fog (this region corresponds to approximately ten meters in front of the vehicle). Line AA' would therefore correspond to the luminosity curve of the visible part of the road in the absence of fog.

In a sixth step (block 20), a second tangent CC' to the luminosity curve LUX is determined. This tangent CC' is tangential at a place of the curve representative of stabilization of the luminosity. It is also illustrated on FIG. 6.

In a non-restrictive embodiment, this second tangent CC' is parallel to the first tangent AA'. This renders the possibility of quickly determining this second tangent. Second tangent CC' touches the curve LUX at a point C1 which corresponds to the beginning of stabilization of luminosity in the upper part of the image, linked to the apparent homogeneity of the sky seen from camera 2.

In a seventh step (block 22), a sweep-line FBL is determined according to the first tangent AA' and second tangent CC', the sweep-line FBL being representative of the distance of visibility D. This sweep-line FBL is determined in the following way.

In a first part step (block 22a), a distance d1 equal to the distance between first tangent AA' and second tangent CC' is defined and this distance d1 is divided by two. The distance d1 is representative of the dynamics of the scene between the darkest zone and the zone of maximum utilizable luminosity, the dynamics therefore corresponding to the difference between the weakest and strongest luminosity.

In a second part step (block 22b), a parallel line BB' to the first tangent AA' and located at distance d1 divided by two, in a non-restrictive mode, from this first tangent AA' is defined. This median tangent is also illustrated on FIG. 6.

In a third part step (block 22c), an intersection point F, also called inflection point, between this parallel straight line BB' and the luminosity curve LUX is defined. The sweep-line FBL is calculated according to this intersection point F since it corresponds to the y-axis of this intersection point F.

In an eighth step (block 24), the distance of visibility D is determined according to the sweep-line FBL obtained in this way.

Thus, in a first non-restrictive embodiment, the following trigonometric calculation is carried out:

$$D = \frac{h}{tg\left(\alpha 0 + \frac{A}{256}\right)(256 - FBL)}$$

where:
 h: height of camera 2 relative to the ground 6,
 A: total angular field,
 $\alpha 0$: value of the minimum sight angle corresponding to the sweep-line 256.

One will note that it has been assumed that the sweep-line n°128 corresponded to the horizon. In a non-restrictive example, total angular field A (also called field of the objective of camera 2) is comprised between 15 and 30°.

One will also note that, as regards this first embodiment, measurement on a complete assembly line of vehicles 1 positioning angles of camera 2 (including the minimum sight angle $\alpha 0$) can be a little difficult to implement and not very precise.

Also, in a second non-restrictive embodiment, trigonometric calculation of the distance of visibility D is not carried out as indicated above, but the distance of visibility D is determined by means of a look-up or correspondence table TAB, which links the sweep-line number FBL found and the distance of visibility D. This table TAB can be downloaded in a memory of a distance-determining device PRO, namely a computer located in camera 2 for example. Thus reading a look-up or correspondence table is more interesting than a trigonometric calculation, being a less time-hungry processor.

The correspondence table TAB is programmed so as to take into consideration, more particularly and in a non-restrictive way, dispersions of the optics and the optical sensor of the camera, which converts photons into electrons and then into video image.

The supports of camera 2 will also be able to be taken into account for programming, if need be, so as to make allowances for the possible sway of the camera, the degrees of freedom of adjustment of camera 2, or the body of vehicle 1

(in view of the tolerances as regards pressing, assembly, production, nature of the materials, etc.).

Thus according to the value of the distance of visibility D obtained in this way, the decision is taken to switch on the fog lamps or otherwise. In a non-restrictive example, if the value of this distance D is less than a threshold equal to 100 meters, it is decided there is fog. The choice is to switch on the fog lamps, either by warning the driver so that he does this manually, or by doing so automatically. Thus, in a non-restrictive embodiment, a detection signal SIG will be emitted if the distance of visibility D falls below a certain threshold, here 100 meters, to warn driver 3 of vehicle 1 to switch on his fog lamps.

And if the value lies between 25 and 50 meters, the fog is very dense and automatic switching on of the fog lamps will be chosen for example.

In the same way, when the distance of visibility becomes normal again, the fog lamps can be switched off.

Access to the distance of visibility D can also render the possibility of influencing the intensity of the fog lamps according to the impact of fog BR (greater density or lesser density) over this distance of visibility. Thus the photometry of the beam of light emitted by the traffic indicator light or the headlamp, in particular its light intensity will be modulated/adjusted by modulating the power supply to the light sources. This modulation for example will be controlled by an automated system of regulation, taking into account the distance of visibility D.

One will note in addition that the detection signal SIG can also be used as a control signal transmitted for example to a CAN (Controller Area Network) bus connected to a card of the LCS (Light System Control) type to act directly on the speed of the vehicle, which can therefore be controlled as a function of fog BR.

The non-restrictive example, which was given above on FIG. 3 is an example in which there is no obstacle in the field of space 4.

Figure 7:
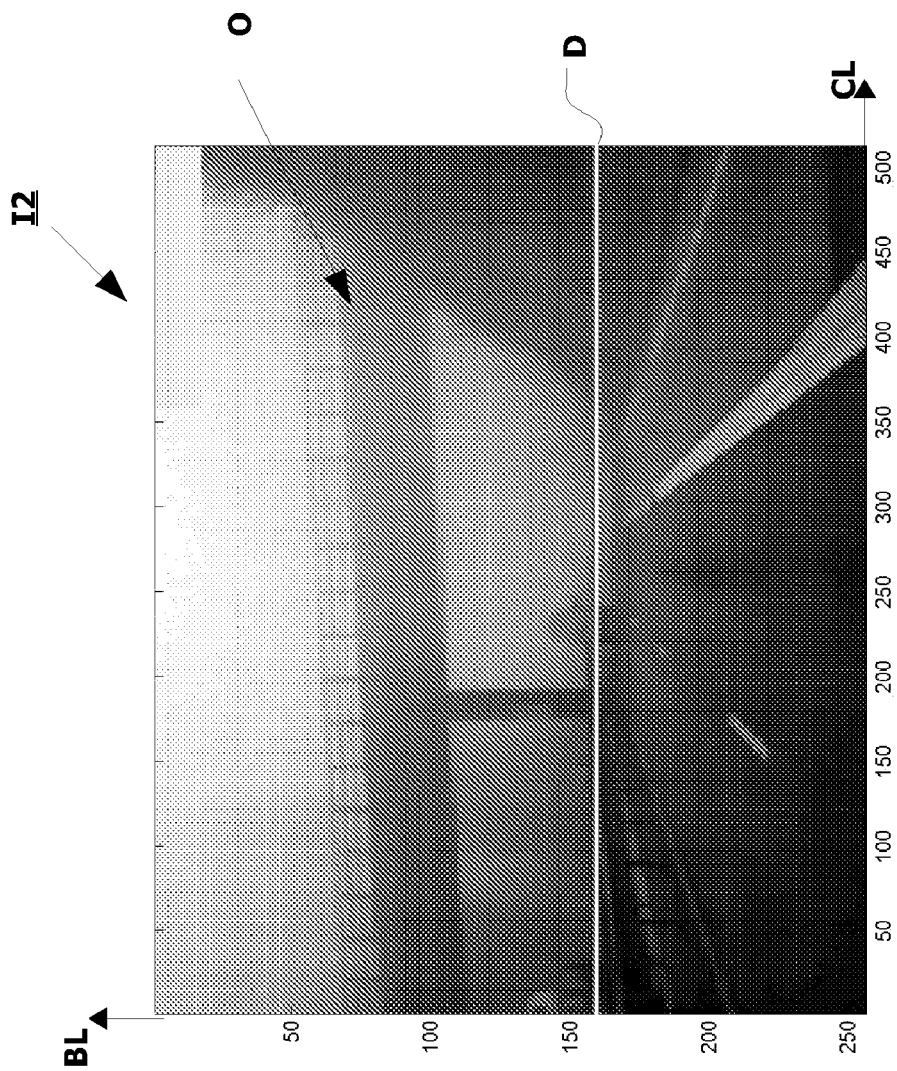
FIG. 7 illustrates a second image comprising an obstacle as videoed in the method according to the invention.
Figure 9:
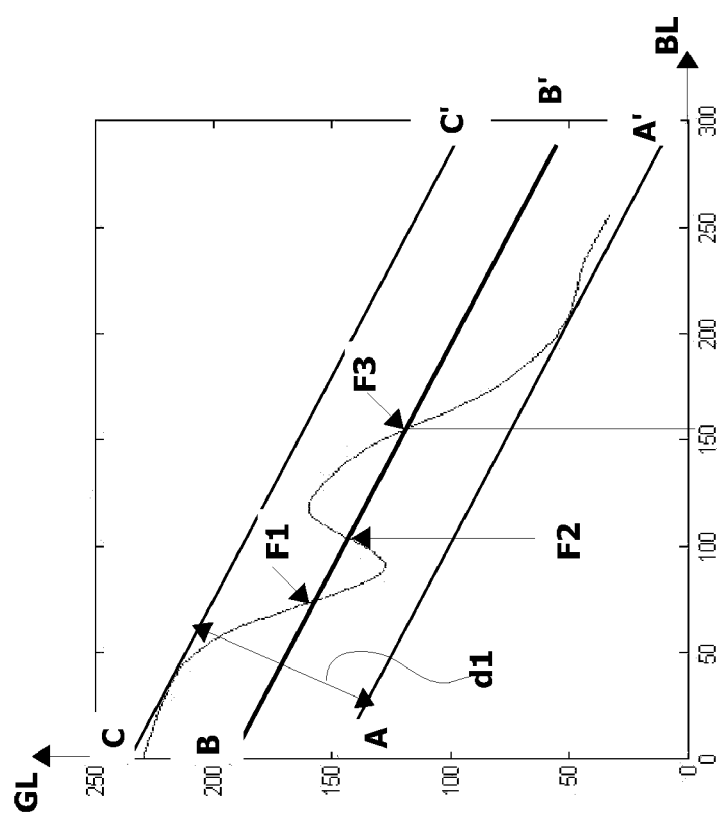
FIG. 9 illustrates the luminosity curve of FIG. 8 on which tangents are plotted.
Figure 8:
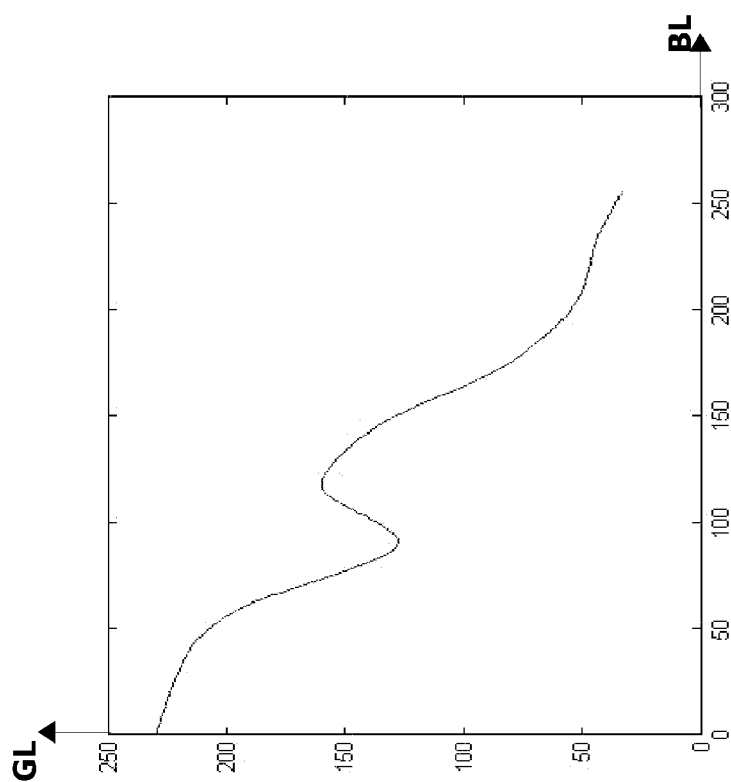
FIG. 8 illustrates a luminosity curve obtained on the basis of the image on FIG. 7 after filtering.

The method for determining the visibility D described is robust because it also functions with a field of space 4 in which one or more obstacles are present on the road, as illustrated on FIGS. 7 to 9.

As can be seen on FIG. 7, camera 2 has taken an image I2 in which road 6 comprises an obstacle, here a bridge O. The distance of visibility D has been shown by a horizontal line on this figure. The curve of luminosity LUX, which is deduced from this image I2 is illustrated on FIG. 8. It presents a corrugated form. As described above, the first tangent AA', second tangent CC' and parallel straight line BB' are plotted and in this case three intersection points F1, F2, F3 are obtained with the curve of luminosity LUX as indicated on FIG. 9. To determine the intersection point corresponding to the distance of visibility D, the first intersection point from the bottom of the curve of luminosity LUX is used. If it is due to an obstacle instead of fog, the principle of detection remains the same, the obstacle giving the distance of visibility D. The intersection point searched is here point F3.

Thus, even if an obstacle is present, it is easy to find the intersection point corresponding to the distance of visibility D.

It will be noted that if there were any ambiguity between the intersection point searched F3 and another intersection point, for example F2, corresponding in fact to an obstacle O (if these two points are very close to one another), it is possible to detect the intersection point corresponding to the obstacle O, so that it is not confused with the point being searched.

Thus in a non-restrictive embodiment, the distortion corresponding to F2 on the curve of luminosity LUX is followed for a short set period of time, between a moment t1 and a moment t2. The distortion will evolve according to the obstacle O, for example the bridge, from the middle of the curve of luminosity LUX (bridge being focused on infinity in the image I2 at moment t1), to the top of the curve (bridge being near the vertical of the vehicle at moment t2). If it concerns an obstacle on the ground or a major variation in the road surface (change from bitumen to concrete for example), the distortion will evolve from the middle of the image downwards. The fast evolution of the distortion linked to the obstacle O, relative to the intersection point searched F3, which is relatively or even totally stable to it over the interval of moments t1-t2 examined, thus renders the possibility of differentiating the two points and finding the correct inflection point F3.

One will note that it is possible, in a non-restrictive embodiment, to take into account the attitude of the vehicle when determining the distance of visibility D. The attitude of the vehicle will be calculated by means of a sensor (not illustrated) fitted to the suspension of the vehicle for example.

Figure 10:
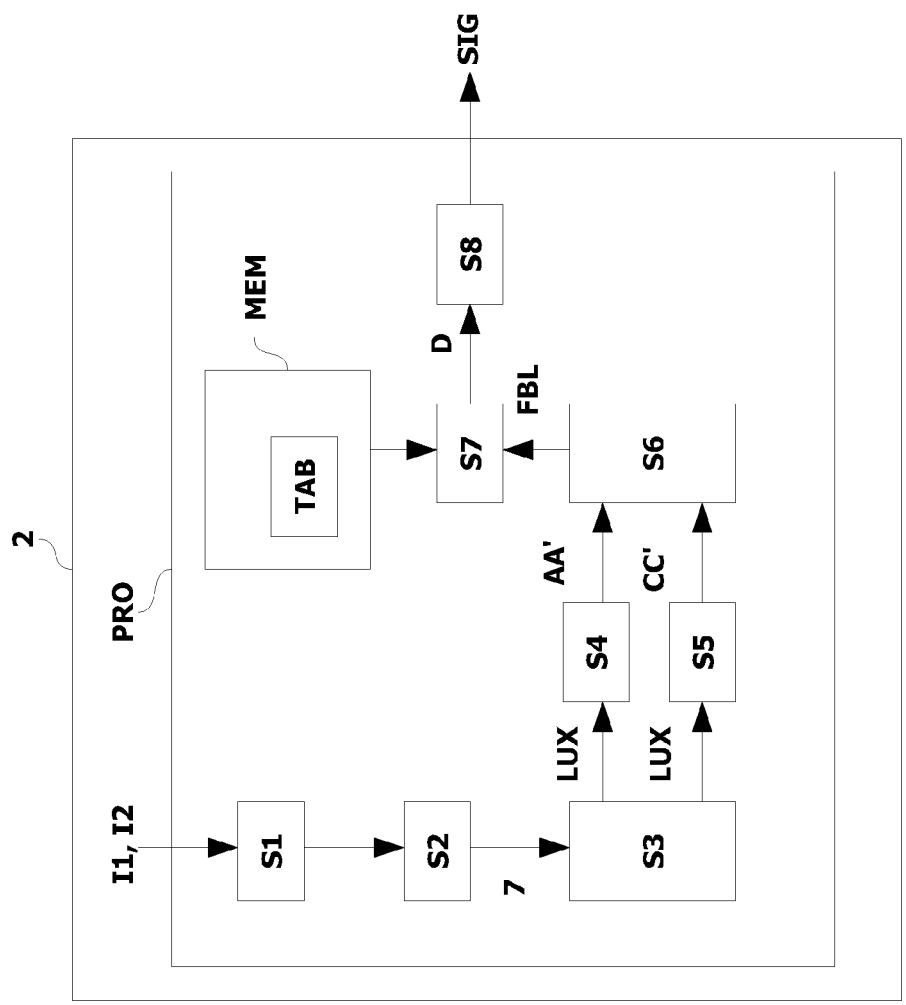
FIG. 10 is a diagram of a distance-determining device rendering the possibility of implementing the method according to the invention.

Lastly it will be noted that to determine the distance of visibility D as described above, vehicle 1 has a distance-determining device PRO illustrated on FIG. 10 rendering the possibility of implementing the process described, and comprising:

- means S1 to receive at least one image I1, I2 videoed on the basis of a field of space located in front of the vehicle, the image being defined by an array of pixels PIX and sweep-lines BL,
- means S2 to separate the image in two parts by the vertical straight line 7 passing through a pre-set point PD,
- means S3 to determine the luminosity of the pixels of the vertical straight line 7, resulting in a curve of luminosity LUX,
- means S4 to determine a first tangent AA' to the curve of luminosity LUX tangential at a place of the curve representative of a region of luminosity substantially independent of disruptive element BR,
- means S5 to determine a second tangent CC' to the curve of luminosity LUX tangential at a place of the curve representative of stabilization of the luminosity, and
- means S6 to determine a sweep-line FBL according to the first and second tangent, the sweep-line being representative of the distance of visibility D.

It comprises moreover:

- means S7 to determine the distance of visibility D on the basis of the sweep-line found FBL and by means of the correspondence table TAB or by means of a trigonometric calculation as described above,
- a memory MEM containing the correspondence table TAB,
- if necessary, means S8 to transmit the detection signal SIG if the distance of visibility D falls below a certain threshold as described above, and
- means FILT of filtering the curve of luminosity LUX.

Of course these means S1 to S8 and FILT can be incorporated in only one set of means or several sets of means.

This device PRO, in a non-restrictive embodiment, is integrated in camera 2 as illustrated on FIG. 10. This mode is more interesting than a mode in which the distance-determining device were integrated at a place remote from the camera, because if this were the case, it would be necessary to convey the video images by means of optical fibers for example, resulting in additional cost and additional means requiring a fast distribution rate of the video images from camera 2 to the distance-determining device. Means S1 to S8 and FILT of the device PRO are hardware, software or both.

Thus the method of determination according to the invention can be implemented by a distance-determining device consisting of hardware, software or both. Such hardware or software can be implemented in various ways such as, respectively, by means of hardwired electronic circuits or an integrated circuit, for example a processor, which is programmed in a suitable way. The integrated circuit can be contained in a portable apparatus, such as the camera. The integrated circuit comprises one or more sequences of instructions. Thus such a sequence of instructions, which is contained for example in a memory of the portable apparatus, allows the integrated circuit to perform the various steps of the distance-determining method. The sequence of instructions can be stored in the memory by reading a data medium, such as in a non-restrictive example a hard disk, CD or DVD. A service provider can also make such a sequence of instructions available via a telecommunication network, such as the Internet for example.

Of course the invention is not limited to the embodiments, which have been just described. In particular the method of searching the zones of homogeneity has been described in the case of methods of segmentation by division-fusion but other methods of segmentation can be used such as the methods by dividing regions or by growing regions known to those skilled in the art.

Moreover the luminosity has been described with reference to the grey level of the pixels of the image but it can also be represented by another magnitude as a function of the coding of image deployed.

In the same way the method according to the invention has been described in the case of fog detection but the method is also applicable to other elements disrupting or modifying the visibility of the driver. Thus the method described is interesting when there is fog, but also as regards any other element, disrupting or modifying the visibility of the driver such as dust or smoke, or other elements having the same light diffusion characteristics, consisting of micrometric-sized particles, if the road comprises an obstacle such as a bridge or a car located in front of the vehicle of the driver or on the opposite carriageway, or does not comprise any obstacle.

Moreover the method described, while only utilizing simple linear combinations (calculation of tangents) is particularly light in computational load and thus fast. Moreover it removes uncertainties related to the noise generated by calculation of derivatives imposed by the search for the inflection point in the prior art method. Lastly the method described is robust because it renders the possibility of establishing distances of visibility, even when obstacles are present, which were too disruptive for utilizing the method used in the prior art. Finally it is a solution, which is simple and not expensive to implement.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method for determining a distance of visibility for a driver of a vehicle in the presence of a disruptive element disrupting the visibility of the driver, comprising the following steps:

videoing at least one image of a field of space located in front of the vehicle, said at least one image being defined by an array of pixels and sweep-lines;

separating said at least one image in two parts by a first line passing through a pre-set point;

determining a luminosity of pixels of said first line;

determining a curve of luminosity using said luminosity of said pixels in said first line;

determining a first tangent to said curve of luminosity tangential at a place of said curve representative of a region of luminosity substantially independent of the disruptive element;

determining a second tangent to said curve of luminosity tangential at a place of said curve representative of stabilization of the luminosity;

determining a sweep-line according to the first tangent and second tangent; and determining the distance of visibility using said sweep-line;

wherein said sweep line is determined using at least one intersection point between said curve of luminosity and a line generally parallel to said first tangent at a given distance from said first tangent and said second tangent.

2. The method according to claim 1, wherein said disruptive element is fog.

3. The method according to claim 1, wherein said first line is a vertical straight line.

4. The method according to claim 1, wherein said method further comprises the steps of:

searching the zones of said at least one image, each responding to a predicate of homogeneity;

determining the center of gravity for each of said zones;

determining the global center of gravity for each of said centers of gravity of said zones, said global center of gravity being said pre-set point.

5. The method according to claim 1, wherein the distance of visibility is determined on the basis of the sweep-line found and by means of a correspondence table or by means of a trigonometric calculation.

6. The method as recited in claim 1, wherein said method steps are stored as a sequence of instructions in a memory of a data medium that are executed by an integrated circuit in response to said at least one image generated which determines said distance of visibility in response thereto.

7. A method for determining a distance of visibility for a driver of a vehicle in the presence of an element disrupting the visibility of the driver, comprising the following steps:

videoing at least one image of a field of space located in front of the vehicle, said at least one image being defined by an array of pixels and sweep-lines;

separating said at least one image in two parts by a first line passing through a pre-set point;

determining a luminosity of pixels of said first line, resulting in a curve of luminosity;

determining a first tangent to the curve of luminosity tangential at a place of said curve representative of a region of luminosity substantially independent of the disruptive element;

determining a second tangent to the curve of luminosity tangential at a place of said curve representative of stabilization of the luminosity;

determining a sweep-line according to the first tangent and second tangent, said sweep-line being representative of a distance of visibility;

wherein said second tangent is parallel to said first tangent.

8. A method for determining a distance of visibility for a driver of a vehicle in the presence of an element disrupting the visibility of the driver, comprising the following steps:
- videoing at least one image of a field of space located in front of the vehicle, said at least one image being defined by an array of pixels and sweep-lines;
- separating said at least one image in two parts by a first line passing through a pre-set point;
- determining a luminosity of pixels of said first line, resulting in a curve of luminosity;
- determining a first tangent to the curve of luminosity tangential at a place of said curve representative of a region of luminosity substantially independent of the disruptive element;
- determining a second tangent to the curve of luminosity tangential at a place of said curve representative of stabilization of the luminosity;
- determining a sweep-line according to the first tangent and second tangent, said sweep-line being representative of a distance of visibility;
- wherein the sweep-line is calculated according to an intersection point between the curve of luminosity and a parallel line to the first tangent at a given distance from said first tangent and said second tangent.

9. The method according to claim 8, wherein the given distance is the distance between the first tangent and second tangent divided by two.

10. A method for determining a distance of visibility for a driver of a vehicle in the presence of an element disrupting the visibility of the driver, comprising the following steps:
- videoing at least one image of a field of space located in front of the vehicle, said at least one image being defined by an array of pixels and sweep-lines;
- separating said at least one image in two parts by a first line passing through a pre-set point;
- determining a luminosity of pixels of said first line, resulting in a curve of luminosity;
- determining a first tangent to the curve of luminosity tangential at a place of said curve representative of a region of luminosity substantially independent of the disruptive element;
- determining a second tangent to the curve of luminosity tangential at a place of said curve representative of stabilization of the luminosity;
- determining a sweep-line according to the first tangent and second tangent, said sweep-line being representative of a distance of visibility;
- wherein the distance of visibility is determined on the basis of the sweep-line found and by means of a correspondence table or by means of a trigonometric calculation;
- wherein said trigonometric calculation is as follows: the distance of visibility is equal to a height relative to the ground of an element taking the image, divided by the tangent of:
- the value of a sight angle the highest sweep-line, plus
- a total angular field divided by the number of the highest sweep-line, the lot multiplied by:
- this number of the highest sweep-line minus sweep-line corresponding to the intersection point calculated.

11. A device for determining a distance of visibility for a driver of a vehicle in the presence of an element disrupting the visibility of the driver, said device comprising:
- means to receive at least one image videoed on the basis of a field of space located in front of the vehicle, said image being defined by an array of pixels and sweep;
- means to separate said at least one image in two parts by a first line passing through a pre-set point;
- means to determine the luminosity of the pixels of said first line;
- means to determine a curve of luminosity using said luminosity of said pixels in said first line;
- means to determine a first tangent to the curve of luminosity tangential at a place of said curve representative of a region of luminosity substantially independent of the disruptive element;
- means to determine a second tangent to the curve of luminosity tangential at a place of said curve representative of stabilization of the luminosity;
- means to determine a sweep-line according to the first tangent and second tangent; and
- means to determine the distance of visibility using said sweep-line;
- wherein said sweep line is determined using at least one intersection point between said curve of luminosity and a line generally parallel to said first tangent at a given distance from said first tangent and said second tangent.

12. The device according to claim 11, which is integrated in a camera on board the vehicle.

13. The device according to claim 11, which comprises moreover means to determine the distance of visibility on the basis of the sweep-line found and by means of a correspondence table or by means of a trigonometric calculation.

14. A device for determining a distance of visibility for a driver of a vehicle in the presence of an element disrupting the visibility of the driver, said device comprising:
- means to receive at least one image videoed on the basis of a field of space located in front of the vehicle, said image being defined by an array of pixels and sweep,
- means to separate said at least one image in two parts by a first line passing through a pre-set point,
- means to determine the luminosity of the pixels of said first line, resulting in a curve of luminosity,
- means to determine a first tangent to the curve of luminosity tangential at a place of said curve representative of a region of luminosity substantially independent of the disruptive element,
- means to determine a second tangent to the curve of luminosity tangential at a place of said curve representative of stabilization of the luminosity, and
- means to determine a sweep-line according to the first tangent and second tangent, said sweep-line being representative of the distance of visibility;
- wherein the sweep-line is calculated according to an intersection point between the curve of luminosity and a parallel line to the first tangent at a given distance from said first tangent and said second tangent.

15. The device according to claim 14, wherein the given distance is the distance between said first tangent and said second tangent divided by two.

* * * * *